(12) United States Patent
Fernandez

(10) Patent No.: US 10,624,456 B2
(45) Date of Patent: Apr. 21, 2020

(54) PORTABLE SEAT CUSHION

(71) Applicant: Jose Ismael Fernandez, Sylmar, CA (US)

(72) Inventor: Jose Ismael Fernandez, Sylmar, CA (US)

( * ) Notice: Subject to any disclaimer, the term of this patent is extended or adjusted under 35 U.S.C. 154(b) by 0 days.

(21) Appl. No.: 15/017,190

(22) Filed: Feb. 5, 2016

(65) Prior Publication Data
US 2017/0224118 A1    Aug. 10, 2017

(51) Int. Cl.
| *A47C 7/02* | (2006.01) |
| *A47C 7/42* | (2006.01) |
| *B60N 2/70* | (2006.01) |
| *B60N 2/56* | (2006.01) |
| *A47C 7/74* | (2006.01) |
| *A47C 7/18* | (2006.01) |

(52) U.S. Cl.
CPC .............. *A47C 7/425* (2013.01); *A47C 7/021* (2013.01); *A47C 7/744* (2013.01); *B60N 2/5657* (2013.01); *B60N 2/7005* (2013.01); *A47C 7/18* (2013.01)

(58) Field of Classification Search
CPC ............ A47C 7/425; A47C 7/021; A47C 7/18
USPC .................. 297/452.37, 452.27, 229, 228.13
See application file for complete search history.

(56) References Cited

U.S. PATENT DOCUMENTS

| 1,925,358 | A |   | 9/1933  | Wittcoff  |           |
|-----------|---|---|---------|-----------|-----------|
| 1,954,376 | A | * | 4/1934  | Brueckl   | A47C 7/021 |
|           |   |   |         |           | 297/223   |
| 2,734,556 | A |   | 2/1956  | Hebrank   |           |
| 2,883,682 | A |   | 4/1959  | Kwake     |           |
| 3,346,298 | A |   | 10/1967 | Champion  |           |
| 3,751,111 | A | * | 8/1973  | Taylor    | A47C 3/12 |
|           |   |   |         |           | 297/451.4 |
| 4,190,918 | A |   | 3/1980  | Harvell   |           |
| D255,523  | S |   | 6/1980  | Yarabinec |           |
| D255,524  | S |   | 6/1980  | Yarabinec |           |
| D258,482  | S |   | 3/1981  | Strock    |           |
| D264,163  | S |   | 5/1982  | Chapman   |           |
| D264,401  | S |   | 5/1982  | Trotman   |           |
| 4,329,747 | A |   | 5/1982  | Russell   |           |
| 4,824,169 | A |   | 4/1989  | Jarrell   |           |
| 4,905,330 | A | * | 3/1990  | Jacobs    | A47C 17/045 |
|           |   |   |         |           | 482/23    |
| D323,757  | S |   | 2/1992  | Bueuchan  |           |
| D325,303  | S |   | 4/1992  | Pettersson |          |

(Continued)

FOREIGN PATENT DOCUMENTS

EP    2227989 A2    2/2015

OTHER PUBLICATIONS

STAYJAX Seat Mats; http://www.stayjax.com; various webpages printed out on Feb. 4, 2016 from the World Wide Web/Internet including "Home Page" (3 individual screenshots of alternating images on Home Page), "Our Story" (3 pages), "Retailers" (3 pages), "Buy a Mat" (4 pages) and "Contact Us" (2 pages).

*Primary Examiner* — Syed A Islam

(57) ABSTRACT

A portable seat cushion for placement on a seat for added comfort and support is provided that includes an elongated rectangular base comprising a front portion, seat portion, and back portion. The base includes a top surface and a bottom surface. The seat cushion also includes a generally wedge-shaped main cushion, and a generally rectangular-shaped back cushion, wherein the main and back cushions engage the base. The seat cushion is moveable between a deployed configuration and a rolled configuration.

20 Claims, 12 Drawing Sheets

(56) References Cited

U.S. PATENT DOCUMENTS

| | | | |
|---|---|---|---|
| D341,979 S | 12/1993 | Peters | |
| 5,294,181 A * | 3/1994 | Rose | A47C 7/021 297/452.25 |
| 5,297,304 A | 3/1994 | O'Sullivan | |
| 5,524,956 A | 6/1996 | Moore | |
| D377,423 S | 1/1997 | Latrella | |
| 5,641,199 A | 6/1997 | Bond-Madsen | |
| D383,634 S | 9/1997 | Selph | |
| 5,918,335 A | 7/1999 | Han | |
| 5,920,933 A | 7/1999 | Chou | |
| 6,009,578 A | 1/2000 | Davis | |
| D424,358 S | 5/2000 | Wang | |
| 6,086,152 A | 7/2000 | Zeller | |
| D430,627 S | 9/2000 | Bergman | |
| 6,155,637 A * | 12/2000 | Waters | A47C 31/113 297/188.01 |
| D440,805 S | 4/2001 | Rogone | |
| 6,241,188 B1 * | 6/2001 | Simpson | B60N 2/6027 244/122 R |
| 6,648,410 B2 * | 11/2003 | Sparks | B60N 2/6036 297/228.1 |
| 6,929,325 B1 | 8/2005 | Goelo | |
| 6,951,367 B1 * | 10/2005 | Dinnan | B60N 2/62 297/228.12 |
| 7,114,776 B1 | 10/2006 | Wiltberger | |
| D541,366 S | 4/2007 | Rominger | |
| 7,255,394 B2 | 8/2007 | Ogura | |
| 7,374,240 B2 * | 5/2008 | Gold | A47C 31/11 297/188.01 |
| 7,461,894 B2 | 12/2008 | Leeds | |
| 7,614,100 B1 * | 11/2009 | Barrington | A47G 9/062 383/4 |
| 7,614,691 B1 * | 11/2009 | Schmitz | A47C 7/021 297/219.1 |
| 7,774,880 B1 | 8/2010 | Botts | |
| D624,343 S | 9/2010 | Long | |
| 7,878,588 B2 * | 2/2011 | Snedeker | A47C 31/11 297/218.1 |
| D637,438 S | 5/2011 | Long | |
| D658,422 S | 5/2012 | Mandell | |
| D699,053 S | 2/2014 | Long | |
| D728,269 S | 5/2015 | Brown | |
| D728,271 S | 5/2015 | Cohen | |
| D774,328 S | 12/2016 | Shamash | |
| D774,801 S | 12/2016 | Clark | |
| 2003/0011222 A1 * | 1/2003 | Ichigaya | A43B 7/081 297/180.1 |
| 2005/0225134 A1 | 10/2005 | Tseng | |
| 2006/0200910 A1 | 9/2006 | Taylor | |
| 2007/0084410 A1 | 4/2007 | Hain | |
| 2011/0266324 A1 | 11/2011 | Krampel | |
| 2013/0187415 A1 * | 7/2013 | Shelley | A47C 31/11 297/183.1 |

* cited by examiner

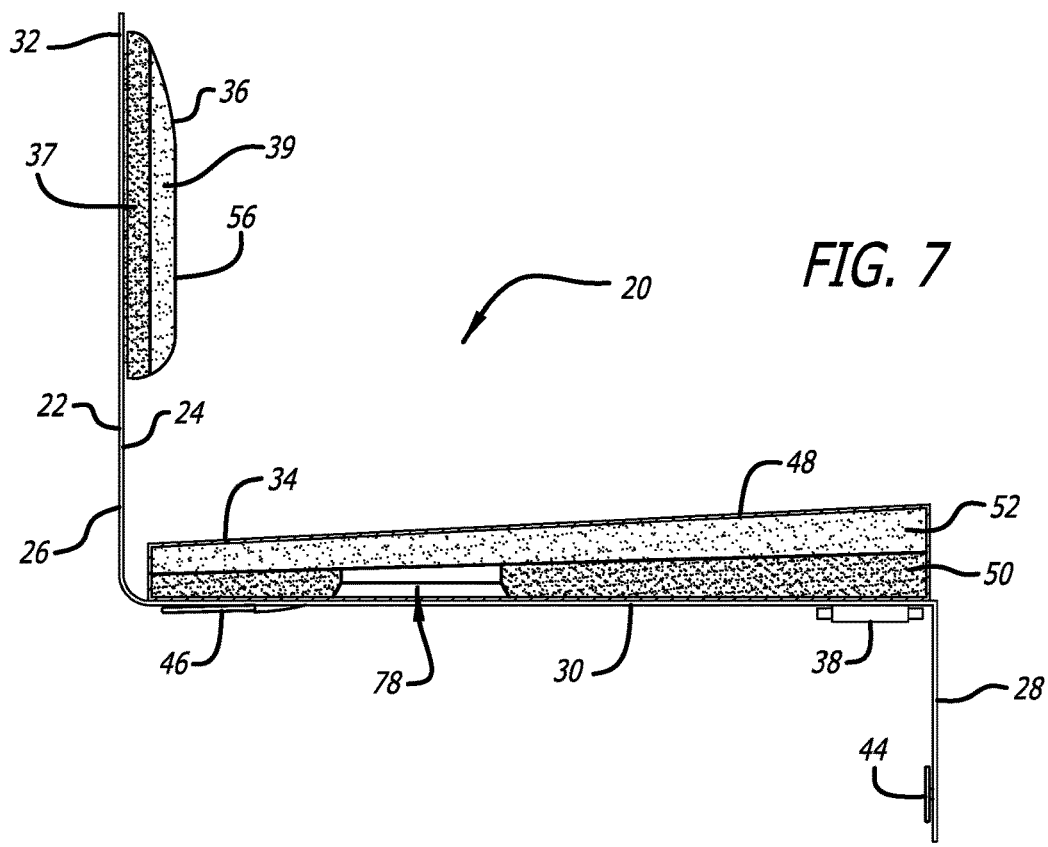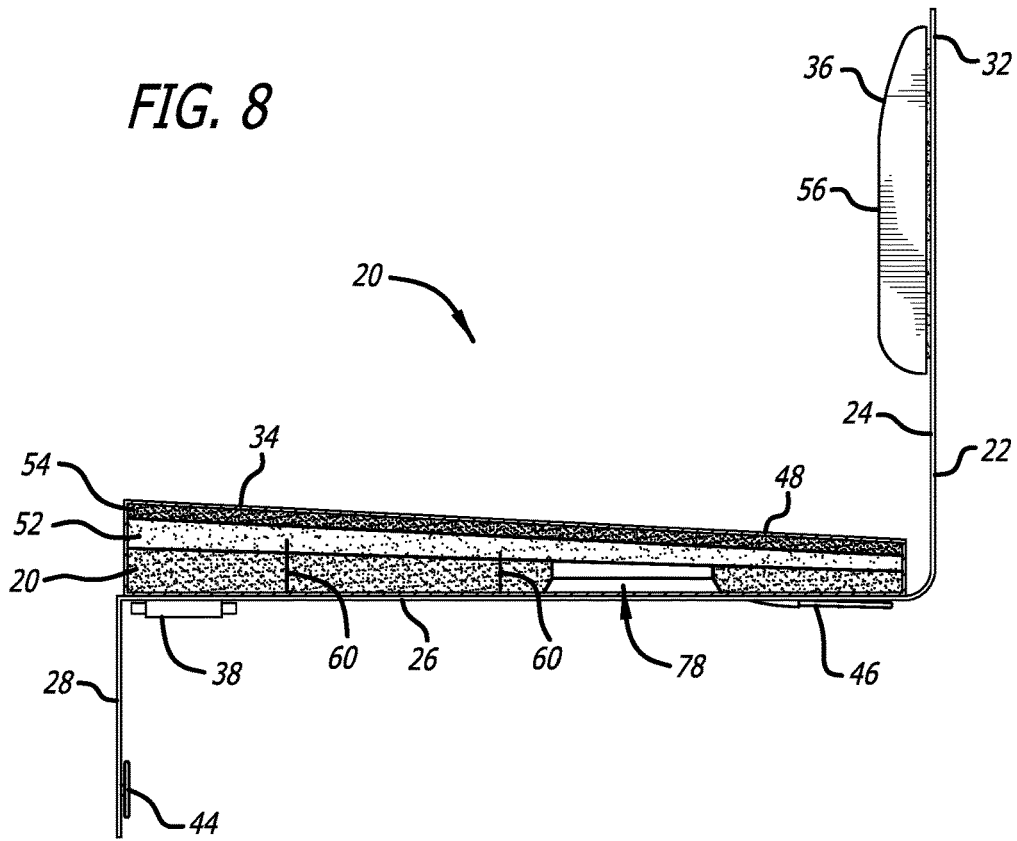

PORTABLE SEAT CUSHION

BACKGROUND

The present invention relates generally to a seat cushion. More particularly, the present invention relates to a portable seat cushion.

There are many forms of public and private transportation available allowing people to travel by land, water, or air. These forms of transportation involve the use of various types of vehicles that include, without limitation, automobiles, taxicabs, trucks, buses, recreational vehicles, trains, boats, and aircraft. All these various forms of transportation include a common element: seating.

Many individuals find riding public transportation, in particular, to be an uncomfortable experience due to the nature and construction of such seating. Seating on public transportation, such as a bus or train, can be designed with durability in mind rather than comfort. To that end, the materials used in the seats must stand up to heavy use and be easily maintained (e.g., quickly and easily cleaned). For example, a passenger seat on a bus, train or the like may be formed from a rigid plastic material with the seat generically sized and shaped so as to accommodate a broad range of people of various sizes and shapes. A passenger sitting in such a seat can be sitting on a hard, rigid seat surface and rest their back against a hard, rigid seatback surface having no lumbar support. Even if the seat has some cushioning, such cushioning may be minimal, and made from low-density materials easily worn down from heavy use that provide little in the way of actual cushioning once the seating has been "broken in" from heavy use. Even if a passenger seat is covered with a fabric, the fabric provides little in the way of comfort as the fabric, like the rest of the seat, is designed for durability and easy maintenance. With durability trumping comfort, sitting even for a short period of time in an uncomfortable seat can be a very unpleasant, and even painful, experience for numbers of individuals.

Furthermore, even seating designed for passenger comfort over long stretches of time, such as an airline passenger seat, may not be comfortable for many individuals because of a passenger's particular medical condition (e.g., a chronic back condition, hemorrhoids, etc.) that can be impacted by the passenger sitting for extended periods of time.

Uncomfortable seating is not just limited to the mode of transportation itself. Seating in a transportation terminal (e.g., bus terminal, train terminal, airport terminal, etc.) can also be uncomfortable as terminal seats may also be made from a rigid plastic material, and a passenger may find themselves having to sit for several hours while waiting for their bus, train, airplane or the like.

There is a need for a portable seat cushion. There is a further need for an improved portable seat cushion that can be easily stowed and deployed. There is an additional need for an improved portable seat cushion that provides cushioning. There is also a need for an improved portable seat cushion that provides lumbar support. There is a need for an improved portable seat cushion that provides adjustability. The present invention satisfies these needs and provides other related advantages.

SUMMARY OF THE INVENTION

A portable seat cushion described herein provides for easy stowage and deployment. A portable seat cushion described herein provides cushioning. A portable seat cushion described herein provides lumbar support. A portable seat cushion described herein provides adjustability.

In one embodiment, a portable seat cushion for placement on a seat for added comfort and support, includes an elongated rectangular base having a front portion, seat portion, and back portion. The base includes a top surface and a bottom surface. The seat cushion also includes a generally wedge-shaped main cushion; and a generally rectangular-shaped back cushion, wherein the main and back cushions engage the base. The seat cushion is moveable between a deployed configuration and a rolled configuration.

The back cushion may be adjustable in position along the back portion. The back cushion may include fasteners matingly engaging fasteners on the back portion.

The main cushion may include a wedge-shaped layer of memory foam. The main cushion may further include a first layer, and a second layer stacked on top of the first layer. The first layer may include a wedge-shaped material having a density different than a density of the second layer. The main cushion may further include a third layer having a density different than at least one of the densities of the first and second layers. A bottom two of the first, second, and third layers may include slits configured to facilitate movement of the seat cushion between the deployed and rolled configurations.

The back cushion may include a first layer, and a second layer adjacent the first layer of the back cushion. The first layer of the back cushion may include a material having a density different than a density of the second layer of the back cushion. At least one of the layers of the back cushion may be made of a memory foam.

The seat cushion may include a mechanism for holding the seat cushion in the rolled configuration. The mechanism may include fasteners for securing the seat cushion in the rolled configuration. For example, in the rolled configuration, the front portion of the seat cushion may include fasteners matingly engaging fasteners located on the seat portion. The front portion of the seat cushion may include at least one pocket.

The back portion of the seat cushion may include reinforcement stitching providing stiffening of the back portion and vertical support to keep the back portion generally upright when the back portion is in a generally vertical position.

The base may be made of a water impermeable material. The bottom surface of the base may include at least one non-slip friction pad to increase friction between the seat cushion and a surface upon which the seat cushion rests.

The seat cushion may further include a carry strap secured on both ends to the bottom surface of the base. The seat cushion may also include a battery-operated fan set within a recess of the main cushion, providing airflow to surfaces of the seat cushion.

The seat cushion may additionally include a generally rectangular panel connected on opposite sides to the bottom surface, leaving a center portion of the rectangular panel open to allow a luggage handle to slide between the bottom surface of the seat cushion and a surface of the panel facing the bottom surface of the seat cushion.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 7 is a side view of the seat cushion of FIG. 6A, partially cut away to reveal an embodiment of a seat portion having two cushion layers;

FIG. 8 is another side view of the seat cushion of FIG. 6A, partially cut away to reveal an embodiment of a seat portion having three cushion layers;

DETAILED DESCRIPTION

Figure 1:
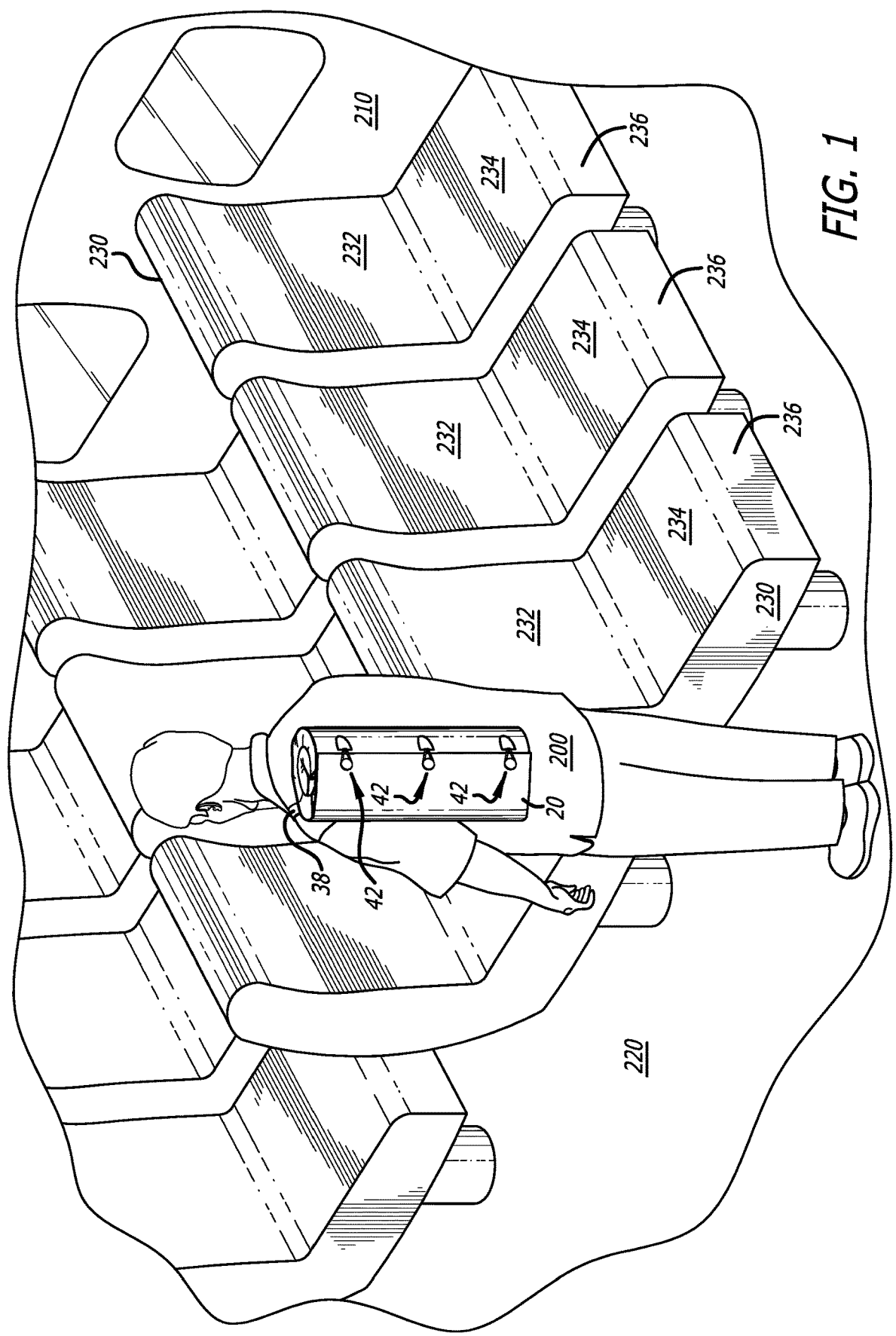
FIG. 1 is a perspective view of a user carrying a seat cushion embodying the invention, where the seat cushion is slung over the user's shoulder in a rolled configuration as the user moves along an aisle towards seating.

The following detailed description describes the present embodiments with reference to the drawings. In the drawings, reference numbers label elements of the present embodiments. These reference numbers are reproduced below in connection with the discussion of the corresponding drawing features.

In FIGS. 1-18, various embodiments of a stylish, aesthetically pleasing portable seat cushion 20 are shown for purposes of illustration. The seat cushion 20 includes a single-piece base 22. The base 22 is elongated and generally rectangular in shape. Alternatively, the base 22 may be generally triangular, circular, oval, ovoid, quadrilateral, pentagonal, or any other generally polygonal shape. The base 22 has a texture that is easy-to-grip and slip-resistant. The base 22 includes a front or top side having a surface 24, and a rear or bottom side having a surface 26. The base 22 further includes a front portion 28, a seat portion 30, and a back portion 32.

The base 22 includes a washable exterior shell with the top and bottom surfaces 24, 26 being water-resistant, if not waterproof/water impermeable. The bottom surface 26 includes one or more non-slip friction pads (e.g., "dots", strips, rectangles or other polygonal shapes of non-slip material (e.g., rubber (natural or synthetic), vinyl, a rubberized fabric or other material, silicone, latex, neoprene, textured material, or other similar material having a high surface friction)) to increase friction and gripping between the bottom surface 26 and any surface the bottom surface 26 contacts in order to allow the seat cushion 20 to be non-slip when the bottom surface 26 comes in contact with a seat, ground surface or other surface upon which the seat cushion 20 rests.

The non-slip portions may be located on any one or more of the front, seat and back portions 28, 30, 32 of the seat cushion 20. Alternatively, non-slip material may generally cover most of the bottom surface 26, or the entire bottom surface 26, of the seat cushion 20. The shell of the base 22 may be made of any durable synthetic or natural material. For example, the shell may be made of exterior layers of various materials including, but not limited to, nylon, waterproof canvas or the like with an interior layer of foam (e.g., memory foam, neoprene, or the like) between the exterior layers and/or the shell may be made of neoprene or other materials. The materials of the shell are either naturally water-resistant, if not waterproof/water impermeable, or are treated so as to be water-resistant, if not waterproof/water impermeable.

The seat cushion 20 further includes a main cushion 34 located on the seat portion 30, and a back cushion 36 located on the back portion 32. In a deployed configuration, the back portion 32 is self-supporting such that the back portion 32 is generally upright. The back portion 32 does not require the use of straps or other means to attach the back portion 32 to a seat back of seat in order to maintain the back portion 32 in a generally, upright (i.e., vertical) position when the seat cushion 20 is in a deployed configuration on a seat. Preferably, the main cushion 34 is generally wedge-shaped. The wedge-shape of the main cushion 34 helps distribute a user's body weight evenly along the back of the user's thighs. The wedge-shape also helps keep the user from sliding forward while seated. In the alternative, the main cushion 34 may be generally rectangular, triangular, circular, oval, ovoid, quadrilateral, pentagonal, or any other generally polygonal shape. The back cushion 36 is generally rectangular-shaped. Alternatively, the back cushion 36 may be generally wedge-shaped, triangular, circular, oval, ovoid, quadrilateral, pentagonal, or any other generally polygonal shape. As seen in FIGS. 2-8, 15 and 16, when the seat cushion is in a deployed configuration, an exterior surface of the back cushion 36 that contacts the base 22 may be generally flat while an exterior surface of an opposite side of the back cushion 36 that engages a user's back may be curved to provide lumbar support to the user's back. As also seen in FIGS. 2-8, 15 and 16, when the seat cushion is in a deployed configuration, an exterior surface of the main cushion 34 that contacts the base 22 conforms to the base 22 (e.g., generally flat when the base 22 is flat, either when held up by a user as seen, for example, in FIG. 2; when the base 22 rests on a generally flat, horizontal surface as seen, for example, in FIGS. 4 and 5; etc.) while an exterior surface of an opposite side of the main cushion 34 that engages a user's posterior may be a flat, angled surface (i.e., prior to coming into contact with a user's body). The seat cushion 20 further includes a retractable carry strap 38 secured on both ends to the bottom surface 26 of the base 22. The strap 38 includes a pair of strap slides 40 (also referred to as slide adjusters, tri-glides or the like) for adjusting the length of the strap 38.

The seat cushion 20 is moveable between a deployed configuration and a rolled configuration. In the rolled configuration, the seat cushion 20 resembles a stylish yoga mat. In a deployed configuration on a seat, the seat cushion 20 is completely self-supporting, not requiring any type of supporting straps, tie downs or the like to secure the seat cushion 20 to a seat back or other portion of the seat. When unrolled, the seat cushion 20 is generally rectangular in shape. The seat cushion 20 includes a mechanism for holding the seat cushion in the rolled configuration. In one example, the means for holding the seat cushion in the rolled configuration includes mechanical fasteners 42 for securing the seat cushion 20 in the rolled configuration. Although button and loop fasteners 42 are illustrated, various types of mechanical fasteners 42 may alternatively be used including, without limitation, hook and loop fasteners (e.g., VELCRO fasteners), zippers, pins, clips, latches, straps, hook and eye fasteners, toggle fasteners, snaps (male and female), buttons and button holes, straps and buckles, any type of male/female engaging fasteners, or the like. As seen in various figures, the front portion 28 includes one or more buttons 44 (three buttons are shown for illustration only) attached thereto that matingly engage corresponding loops 46 attached to the seat portion 30 when the seat cushion 20 is in the rolled configuration. The loop portion of the loops 46 may be made from either a non-extendable material or extendable material allowing the loop 46 to resiliently extend around and engage a button 44. The buttons 44 are located on the front portion 28 near a distal end of the base 22. The buttons 44 may be sown to the base 22. The loops 46 are located on an end of the seat portion 30 adjacent the back portion 32. Alternatively, an elastic strap (not shown) may be placed around each end of the rolled up seat cushion 20 to keep the seat cushion 20 rolled. In an additional alternative, at least two elastic straps may be connected to the bottom surface 26 of the seat cushion 20 on opposite sides of the base 22 such that, when the seat cushion 20 is rolled up, each end of the rolled up seat cushion 20 may have an associated one of the elastic straps wrapped around it to keep the seat cushion 20 rolled.

Figure 5:
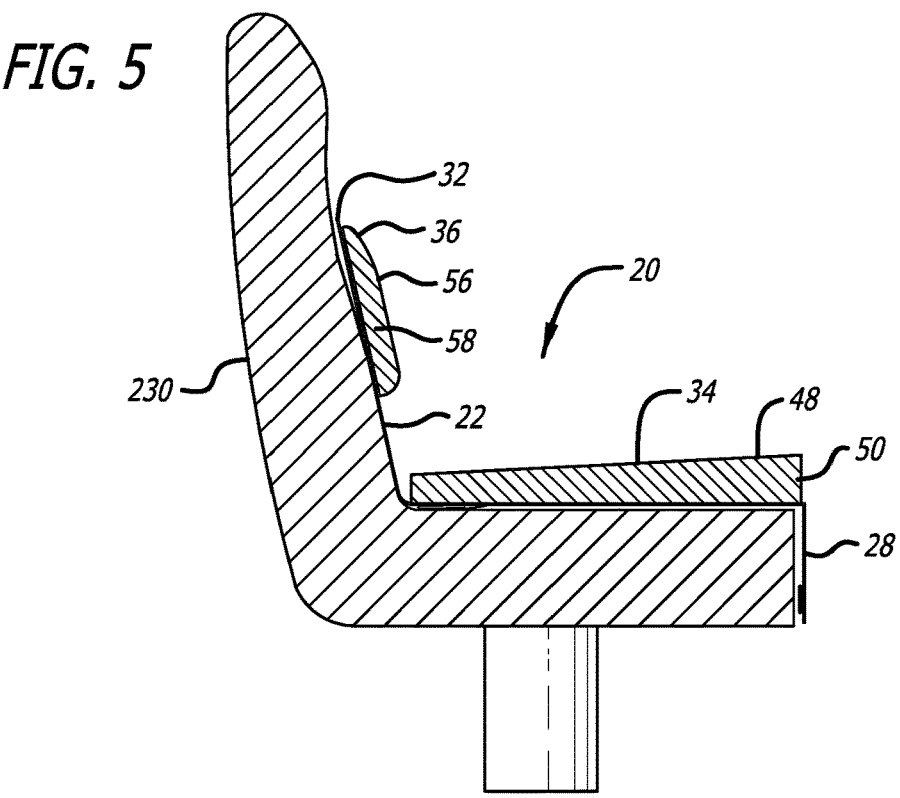
FIG. 5 is a cross-sectional side view of the seat cushion of FIG. 1 taken along Line 5-5 of FIG. 3.
Figure 11:
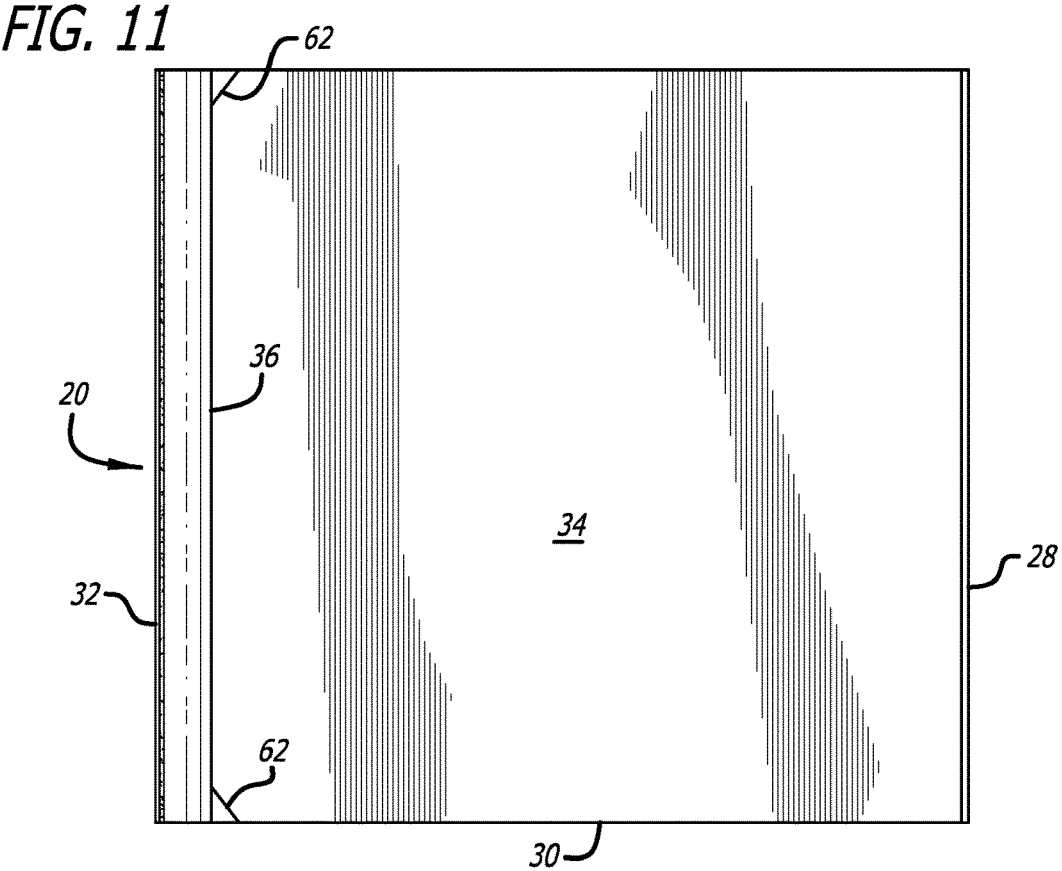
FIG. 11 is a top plan view of the seat cushion of FIG. 7.
Figure 12:
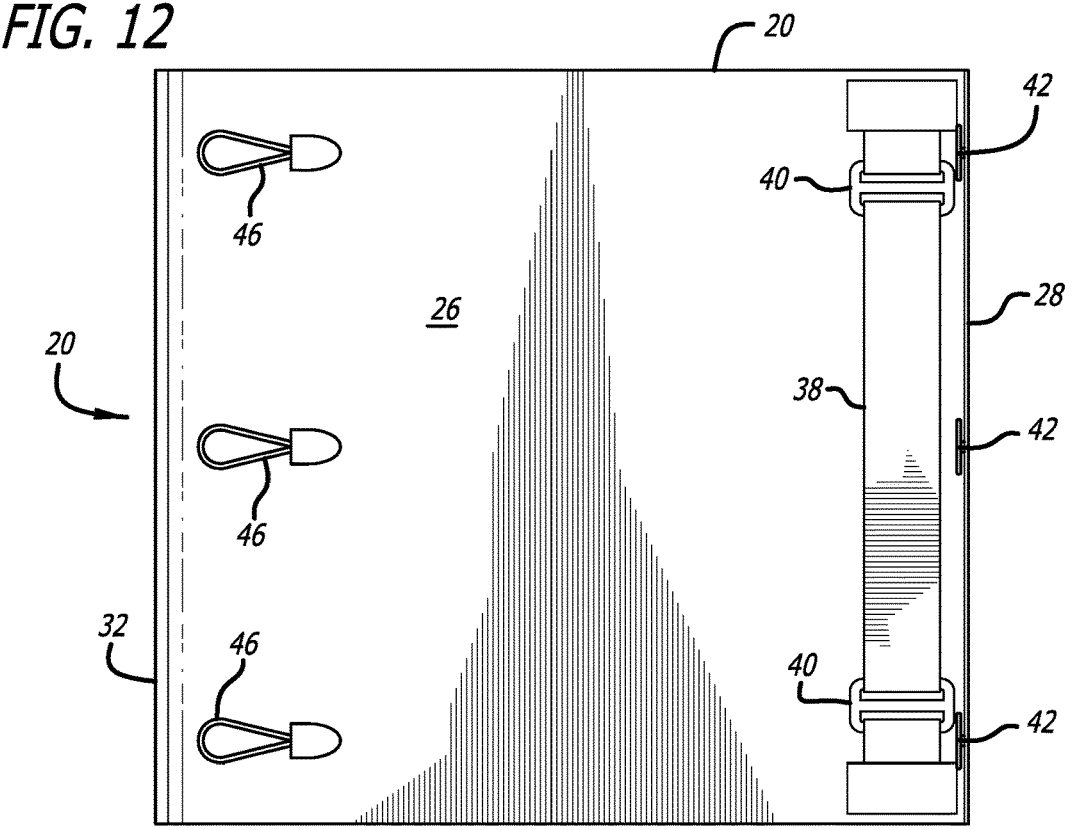
FIG. 12 is a bottom plan view of the seat cushion of FIG. 8.
Figure 13:
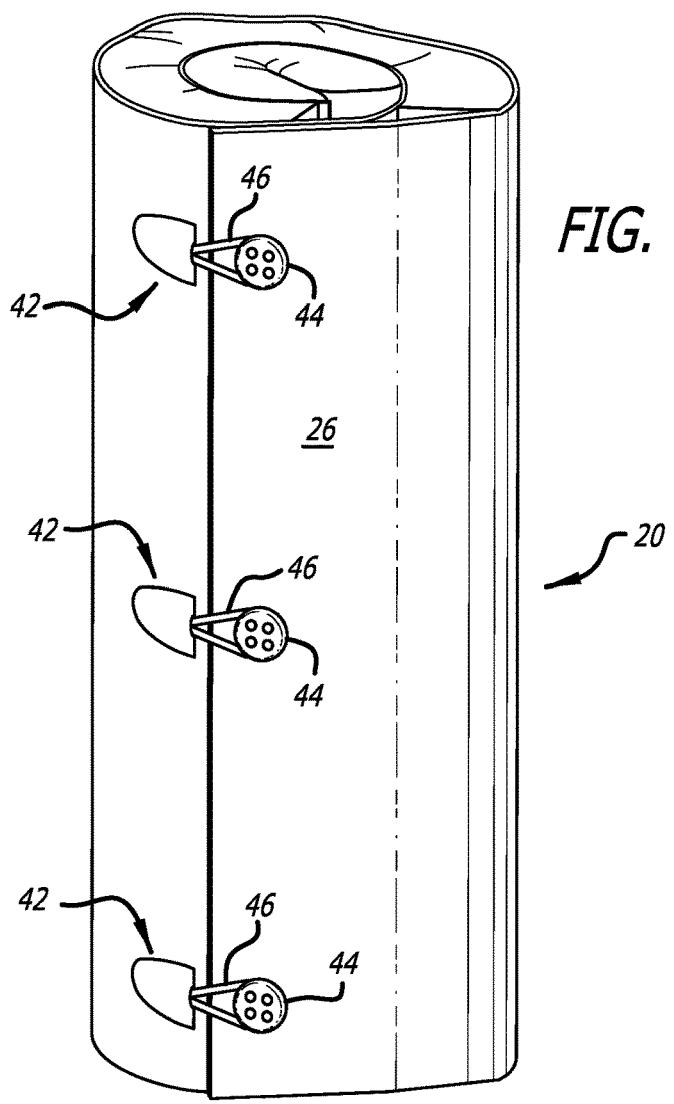
FIG. 13 is a perspective view of a seat cushion embodying the invention in a rolled configuration.
Figure 14:
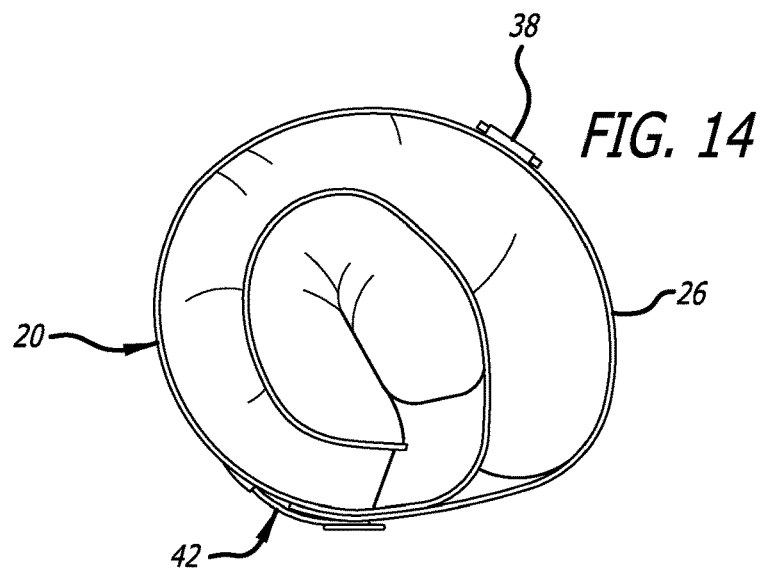
FIG. 14 is a top plan view of the seat cushion of FIG. 13.

As stated above, the main cushion 34 is preferably wedge-shaped. The tall edge of the wedge faces the leading edge of the main cushion 34, and the narrow edge facing closest to the back portion 32. The wedge-shape of the main cushion 34 distributes the body weight of the user sitting upon it from an isolated section of the rear portion of the main cushion 34 to the entire surface of the main cushion 34. In short, relieving hot spots and pressure points when the user is seated over long periods of time. The main cushion 34 includes a generally wedge-shaped fabric housing 48. The housing 48 is made from the same/similar materials as those used for the shell of the base 22. The housing 48 includes an opening (not shown) along one side of the housing 48 that may be opened/closed via a mechanical fastener(s) (e.g., a zipper). The main cushion 34 further includes one or more cushion layers contained within the housing 48. The one or more cushion layers may be placed within or removed from the housing 48 through the opening of the housing 48. When there are at least two cushion layers, the cushion layers are generally stacked on top of each other. In general, no matter how many cushion layers there are, at least one of the cushion layers is a wedge-shaped cushion layer (appearing generally square when viewed from above, as seen in FIG. 11). FIG. 5 illustrates an embodiment of the main cushion 34 having only a single wedge-shaped cushion layer 50. FIG. 7 illustrates an embodiment of the main cushion 34 having two stacked cushions layers, with a generally rectangular (preferably square) cushion layer 52 stacked on top of the wedge-shaped cushion layer 50 which comprises the bottom layer of the two-layer stack. FIG. 8 illustrates an embodiment of the main cushion 34 having three stacked cushions layers, with a top generally rectangular (preferably square) cushion layer 54, a middle generally rectangular (preferably square) cushion layer 52, and a bottom wedge-shaped cushion layer 50. Alternatively, cushion layer 54 may be the middle layer with cushion layer 52 as the top layer). When there are multiple cushion layers, it is preferable that the bottom cushion layer is the wedge-shaped cushion layer but the wedge-shaped cushion layer need not be limited to being the bottom-most layer. Alternatively, a wedge-shaped cushion layer may be on top of a rectangular cushion layer and, in a further alternative, a wedge-shaped cushion layer may be sandwiched between rectangular cushion layers. In a further alternative, there may be more than one wedge-shaped cushion layer. In another alternative, each cushion layer within the main cushion 34 can be individually wrapped in rayon bemberg lining material. The housing 48 of a main cushion 34 having a two-layer cushion stack may be the same size as the housing 48 of a main cushion 34 having a three-layer stack, with the thickness of each layer adjusted accordingly, as well as the density/firmness of each layer. Likewise, the housing 48 of a main cushion 34 having a single wedge-shaped cushion stack may be the same size as the housing 48 of a main cushion 34 having a two-layer or three-layer stack, with the thickness of each layer adjusted accordingly, as well as the density/firmness of each layer.

As seen in FIGS. 7 and 8, the wedge-shaped bottom cushion layer 50 of the two-layer or three-layer stack may include a generally central aperture or bore 78 extending through the bottom cushion layer 50. As viewed from the side in cross-section in FIGS. 7 and 8, the aperture or bore 78 is slightly off-center from a center of the wedge-shaped bottom cushion layer 50 towards the back of the cushion layer 50. The aperture or bore 78 may have a generally oval shape when viewing the bottom cushion layer 50 from the top or bottom. In the alternative, the aperture or bore 78 may have various other polygonal shapes including, but not limited to, circular, triangular, rectangular, square, pentagonal, etc. when viewing the bottom cushion layer 50 from a top surface or a bottom surface of the bottom layer 50. The central aperture or bore 78 in the bottom cushion layer 50 assists in minimizing the bunching of foam at the center of the seat cushion 20. As seen in FIGS. 7 and 8, the dimensions of the walls of the ovoid-shaped aperture or bore 78 remain constant from the top surface of the bottom cushion layer 50 to about halfway through the thickness of the bottom cushion layer 50. From that point downward to the bottom surface of the bottom cushion layer 50, the walls of the bore 78 bevel outwardly such that the shape of the bore 78 is maintained but appears larger on the bottom surface of the bottom cushion layer 50 than on the top surface of the bottom cushion layer 50. In the alternative, the bottom cushion layer 50 of a two-layer or three-layer stack may not include a central aperture or bore 78. In another alternative, the wedge-shaped cushion layer 50 where the cushion layer 50 is the only cushion of the main cushion 34 may or may not include a central aperture or bore 78. When a single-layer main cushion 34 includes a central aperture or bore 78 in the cushion layer 50, the fabric housing 48 may cover the aperture or bore 78 or, in the alternative, extend through the surfaces of the bore 78 to give an appearance of the main cushion 34 having a "doughnut hole."

The upper cushion layer of a two-layer stack in a main cushion 34 is generally square when viewed from above (or below) with rectangular cross-sections (when viewed from the side). Likewise, the two upper cushion layers of a three-layer stack in a main cushion 34 are each generally square when viewed from above (or below) with rectangular cross-sections (when viewed from the side). As the housing 48 of the main cushion 34 is wedge-shaped, and the upper cushion layers rest on the inclined top surface of the wedge-shaped cushion layer, the front and back sides of the upper square cushion layers may be angled so they are flush with the generally vertical sides of the housing 48 to form a generally wedge-shaped stack. In the alternative, the main cushion 34 may be generally rectangular-shaped, having a flat, generally horizontal upper surface with various combinations of wedge-shaped and/or rectangular-shaped cushions of stacked to form a generally rectangular-shaped stack.

A cushion layer of the main cushion 34 can be made from various types of foam or foam-like material including, without limitation, memory foam (ranging from low to high density, low to high firmness) (also referred to as "viscoelastic" polyurethane foam, or low-resilience polyurethane foam), rubber, rubber latex, polyurethane, polychloroprene (e.g., neoprene), foam latex, poly foam, or the like. Alternatively, gel memory foam (also referred to as gel visco) may also be used. In general, the bottom-most cushion layer of the main cushion 34 will have the densest foam. Memory foam (also referred to as "viscoelastic" polyurethane foam, or low-resilience polyurethane foam) is polyurethane with additional chemicals increasing its viscosity and density. The property of firmness (hard to soft) of memory foam is used in determining comfort. Firmness is measured by a foam's "indentation load deflection" (ILD) rating (also referred to as "indentation force deflection" (IFD)). However, it is not a complete measurement of a "soft" or "firm" feel. A foam of higher ILD foam but lower density can feel soft when compressed. Each cushion layer may comprise a memory foam having a particular density selected from a range of 1 to 8 pounds per cubic foot density (16-128 kilograms per cubic meter) (preferably 2.5 to 5 pounds per cubic foot), and a firmness ranging of 6 to 45 ILD (preferably 12-15 ILD). In one example, a main cushion 34 may have cushion layers having a firmness of 12 ILD, but the layers having varying densities with one layer having a density of 2.5 pounds per cubic foot, another layer having a density of 4 pounds per cubic foot, and yet another layer having a density of 5 pounds per cubic foot.

In an embodiment of the main cushion 34 comprising a three-layer stack, the bottom layer may comprise a wedge-shaped memory foam cushion layer 50 having a density different from one or both of the other two cushion layers 52, 54 directly above it. Alternatively, the wedge-shaped memory foam cushion layer 50 may have a density the same as one or both of the other two cushion layers 52, 54 directly above it. Each of the two upper memory foam cushion layers 52, 54 may have different density than the other layer 54, 52 or the same density as the other layer 54, 52.

In a further embodiment, as seen in FIG. 8, a bottom two of the first, second, and third layers of a three-cushion layer stack of the main cushion 34 includes a plurality of slits 60 configured to facilitate movement of the seat cushion 20 between the deployed and rolled configurations. The slits 60 may be formed on the bottom sides of the bottom two layers of the three-cushion layer stack within the main cushion 34. The bottom two layers may be fused together (mechanically and/or chemically). These slits 60 run from side-to-side of the main cushion 34, allowing the cushion layers to be rolled more easily and return to their original shape when unrolled. In one embodiment, three (3) evenly spaced slits 60 may be formed into the three-cushion layer stack from below (i.e., from the bottom side of the bottom layer), to about three-fourths (¾) of the way through the middle layer. Alternatively, a bottom two of the first, second, and third layers of the main cushion 34 includes channels (not shown) configured to facilitate movement of the seat cushion 20 between the deployed and rolled configurations. The channels may be used as an alternative to slits. The channels may be formed on the bottom sides of the bottom two layers of a multi-layer cushion stack within the main cushion 34. These channels run from side-to-side of the main cushion 34, allowing the cushion layers, and by extension the seat cushion, to be rolled more easily and return to their original shape when unrolled. The channels may be a variety of shapes including, but not limited to, V-shaped, U-shaped, or the like. While the channels can be used with any type of foam layer material, channels can be effectively utilized where a poly foam layer material serves as the base cushion layer of a multi-layer cushion stack.

As seen in FIGS. 2-4, 6A, 6B, and 11, the shape of the main cushion 34 may be contoured to better fit a particular type of seat or otherwise allow the seat cushion to be positioned closer to a seatback of a seat. For example, a certain type of seat may have a seatback having a surface that angles inwardly (e.g., an airline seat). For a seat cushion 20 adapted to an airline seat, back corners 62 of the main cushion 34 may be beveled or notched at the back edge of the main cushion 34 so as to provide notched corners 62. Without the notched corners 62, there might be a gap at the back of the seat between seat cushion 20 and the seatback of the seat. Notched corners 62 may also be useful in rolling the seat cushion 20 into a rolled configuration.

Figure 10:
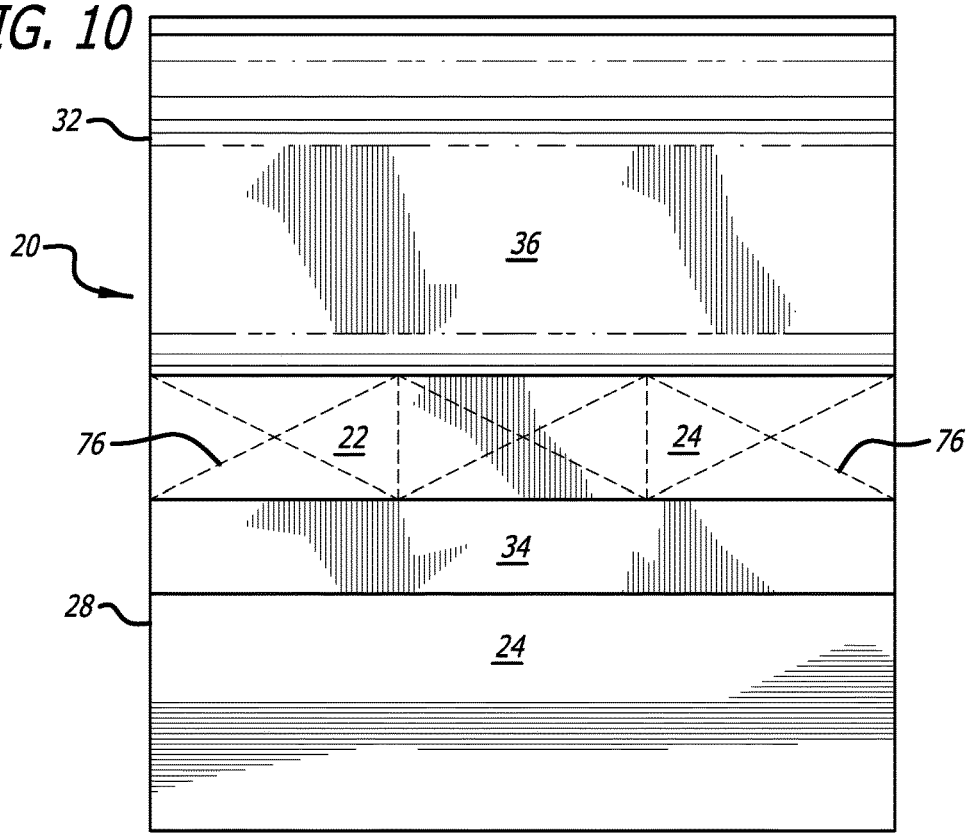
FIG. 10 is a front view of the seat cushion of FIG. 8.

As stated above, the back cushion 36 is generally rectangular-shaped and has a predetermined stiffness, density, shape, and contour to provide lumbar back support. The back cushion 36 includes a generally rectangular fabric housing 56. The housing 56 is made from the same/similar materials as those used for the shell of the base 22 and/or the housing 48 of the main cushion 34. The housing 56 includes an opening (not shown) along one side of the housing 56 that may be opened/closed via a mechanical fastener(s) (e.g., a zipper). The back cushion 36 further includes one or more cushion layers contained within the housing 56. The one or more cushion layers may be placed within or removed from the housing 56 through the opening of the housing 56. When there are at least two cushion layers, the cushion layers are generally stacked on top of each other. The surface of the housing 56 that contacts the base 22 may be generally flat while an exterior surface of an opposite side of the housing 56 that engages a user's back may be curved to provide lumbar support to the user's back. In general, no matter how many cushion layers there are, at least one of the cushion layers is curved to provide lumbar support to the user's back (appearing generally rectangular when viewed from the front, as seen in FIG. 10). In the alternative, the surface of the housing 56 of the back cushion 36 contacting a user's back could be generally flat, with the underlying cushion also generally flat. FIG. 5 illustrates an embodiment of the back cushion 36 having only a single cushion layer 58 having a curved surface. In the alternative, the back cushion 36 further includes two adjacent cushion layers contained within the housing 56, with a generally rectangular cushion layer having generally flat surfaces (positioned in the housing 56 closest to the base 22), and another generally rectangular cushion layer having generally flat surfaces and a curved surface (positioned in the housing 56 closest to the user in order to provide lumbar support to the user's back). Alternatively, both cushion layers are generally rectangular cushion layers having generally flat surfaces. In a further alternative, the back cushion 36 can include more than two cushion layers. The housing 56 of a back cushion 36 having a single-layer cushion stack may be the same size as the housing 56 of a back cushion 36 having a two-layer or three-layer stack, with the thickness of each layer adjusted accordingly, as well as the density/firmness of each layer.

A cushion layer of the back cushion 36 can be made from various types of foam or foam-like material including, without limitation, memory foam (ranging from low to high density, low to high firmness), rubber, rubber latex, neoprene, or the like. Alternatively, gel memory foam (also referred to as gel visco) may also be used. In a single cushion layer embodiment of a back cushion 36, the single cushion layer is preferably made of memory foam though, as stated above, the single cushion layer may be made from materials other than memory foam. In an embodiment of a back cushion 36 having more than one cushion layer, the cushion layers may be made from the same material but with different densities, different materials having the same density, different materials having different densities, or the like. For example, as illustrated in FIG. 7, the back cushion 36 can include a first layer 37, and a second layer 39 adjacent the first layer 37 of the back cushion 36, wherein the first layer 37 of the back cushion 36 includes a material having a density different than a density of the second layer 39 of the back cushion 36. In an embodiment of a back cushion 36 having more than one cushion layer, it is preferred that the cushion layer closest to the user's body comprise a memory foam material. In another alternative, each cushion layer within the back cushion 36 can be individually wrapped in rayon bemberg lining material.

The back cushion 36 is adjustable in position along the back portion 32 (e.g., when the back portion 32 is in a vertical position, the back cushion 36 can be "raised" or "lowered" along the back portion 32). The back cushion includes fasteners (not shown for clarity) that matingly engage fasteners (not shown for clarity) on the back portion. Various types of mechanical fasteners may be used for removably securing the back cushion 36 to the back portion 32 in a manner that allows for subsequent adjustment of the position of the back cushion 36 along the back portion 32. These various types of mechanical fasteners include, without limitation, hook and loop fasteners (e.g., VELCRO fasteners), button and loop fasteners, zippers, pins, clips, latches, straps, hook and eye fasteners, toggle fasteners, snaps (male and female), buttons and button holes, straps and buckles, any type of male/female engaging fasteners, or the like. In one embodiment, hook and loop fasteners (i.e., a hook component and a loop component) are attached (e.g., mechanically (e.g., sewn), chemically (e.g., attached with an adhesive) or otherwise connected and/or bonded) to the opposing surfaces of the back cushion 36 and back portion 32 that are to be operationally engaged. The hook component includes tiny hooks that engage "hairy" loops of the loop component. The hook and loop fasteners may be in the form of lineal fabric strips or, alternatively, round "dots" or squares. The hook and loops fasteners may be located anywhere on the back surface of the back cushion 36 and the front surface of the back portion 32. In a particular example, a lineal strip of hook component can be located on at least two opposite sides of the back cushion 36 with corresponding lineal strips of loop component located on the back portion 32 so as to operationally engage the lineal strips of hook component when the back cushion 36 is pressed against the back portion 32. Regardless of whether the back portion 32 is in a generally vertical position, generally horizontal position, or somewhere in between, the "height" of the back cushion 36 on the back portion 32 can be adjusted. For example, when the back portion 32 is in a generally vertical position, and the at least two parallel, spaced-apart linear strips of hook and loop fastener are longitudinally oriented along the back portion 32, the vertical height of the back cushion 36 can be maximized by operationally engaging the lowermost portions of the linear strips of hook and look fastener on the back cushion 36 (corresponding in orientation and relative position to the linear strips on the back portion 32) to the uppermost portions of the linear strips of hook and loop fastener on the back portion 32. Likewise, the vertical height of the back cushion 36 can be minimized by operationally engaging the uppermost portions of the linear strips of hook and look fastener on the back cushion 36 to the lowermost portions of the linear strips of hook and loop fastener on the back portion 32 (or as low along the linear strips of hook and loop fastener on the back portion 32 as the uppermost portions of the linear hook and look fastener strips on the back cushion 36 can go before the bottom of the back cushion 36 abuts against or otherwise engages the seat portion 30 and/or the main cushion 34 and can be lowered no further). The back cushion 36 is removable from the seat cushion 20. In a user so chooses, the user can detach the back cushion 36 from the seat cushion 20, and use the seat cushion 20 without the back cushion 36.

The back portion 32 of the seat cushion 20 may include reinforcement stitching 76 that provides vertical support to the back portion 32. The stitching 76 provides reinforcement to the back portion 32 such that the stitching 76 provides stiffening of the back portion 32 in order to provide vertical support to keep the back portion 32 generally upright when the back portion 32 is in a generally vertical position. To reinforce the back portion 32 in general, and a lower lumbar section of the back portion 32 in particular, an inner layer of laminated loop fabric (e.g., Tempo® and stitch is added through front to back. This provides enough rigidity to the back portion 32 to be self-supporting, while still allowing the back portion 32 to have enough flexibility to be easily rolled for convenience and transportation.

Alternatively, the back portion 32 includes a plurality of elongated, resilient flexible slats disposed within the back portion 32. The slats provide a mechanism for reinforcing the back portion 32, and keeping the back portion 32 upright when the back portion 32 is in a generally vertical position. The slats may be flat or slightly curved along a longitudinal axis. The slats provide a spring-like effect that allows the seat cushion 20, or at least the back portion 32, to automatically rollout towards the deployed configuration from the rolled configuration. The slats may be made of a suitable resilient material including, but not limited to, metallic material (e.g., steel), heavy fabric, fiberglass, plastic or any suitable elastomeric material. The slats may be oriented along a longitudinal length of the seat cushion 20. The slats may be positioned within insert pockets formed within the interior of the back portion 32 and sewn shut or, alternatively, the insert pockets may be sewn on an outer surface of the back portion 32 for the slats to be inserted into. Folds of material (not shown) located on the back portion 32 cover the openings (not shown) of the insert pockets through which the slats are inserted into the insert pockets. The resiliency and flexibility of the slats help achieve the springlike rolling out effect when the seat cushion 20 is moved from a rolled, closed configuration to an open, deployed configuration. When the fasteners 42 securing the seat cushion 20 in the rolled configuration are released, the slats allow at least a portion of the cushion seat 20 to automatically roll out. The resilient, flexible slats within the back portion 32 aid in the unrolling as the slats unroll into generally linear configuration from a generally rolled configuration, providing linear, upright, vertical support for the back portion 32 when the back portion 32 is in a generally vertical position. When the seat cushion 20 is ready to be put away, the seat cushion 20 is rolled back up, with the slats rolling up along with the back portion 32, with the seat cushion 20 then fastened in the closed or rolled configuration.

Various surfaces of the seat cushion 20 can be covered with fasteners (e.g., hook and loop fasteners) so that when the seat cushion 20 is rolled up, the fasteners on the surfaces can be pressed against each other to assist the other mechanical fasteners 42 in holding the seat cushion 20 in the rolled configuration. In yet another alternative, a strap covered with hook and loop fasteners can be wrapped around the rolled up seat cushion 20 and held in place by hook and loop fasteners on a surface of the seat cushion 20.

Figure 6A:
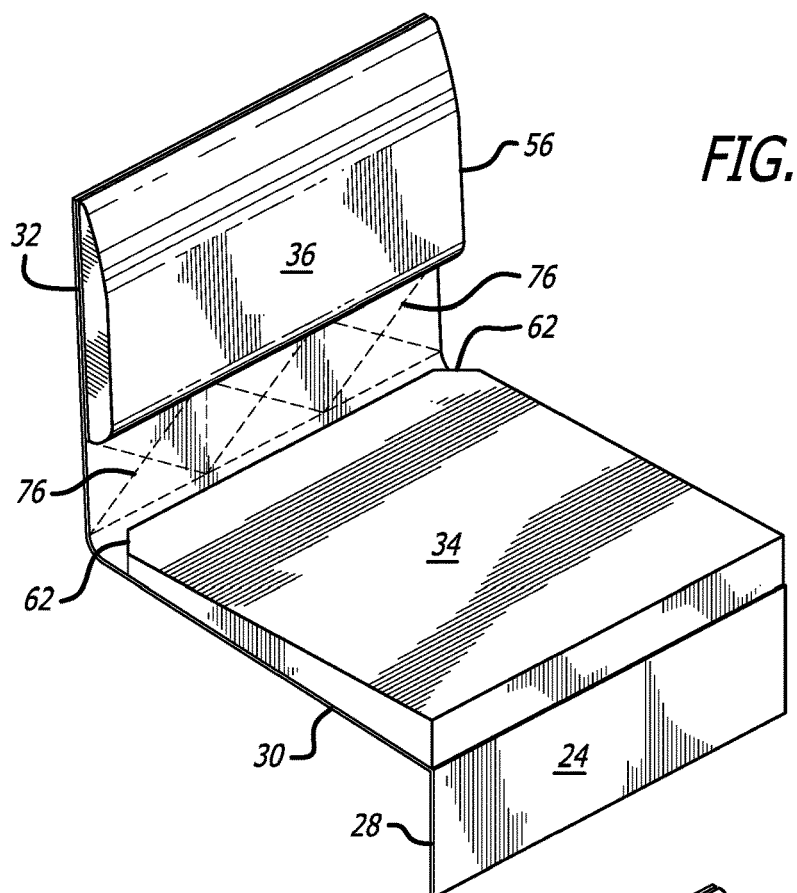
FIG. 6A is a perspective view of another seat cushion embodying the invention, with a main cushion having notched corners.
Figure 6B:
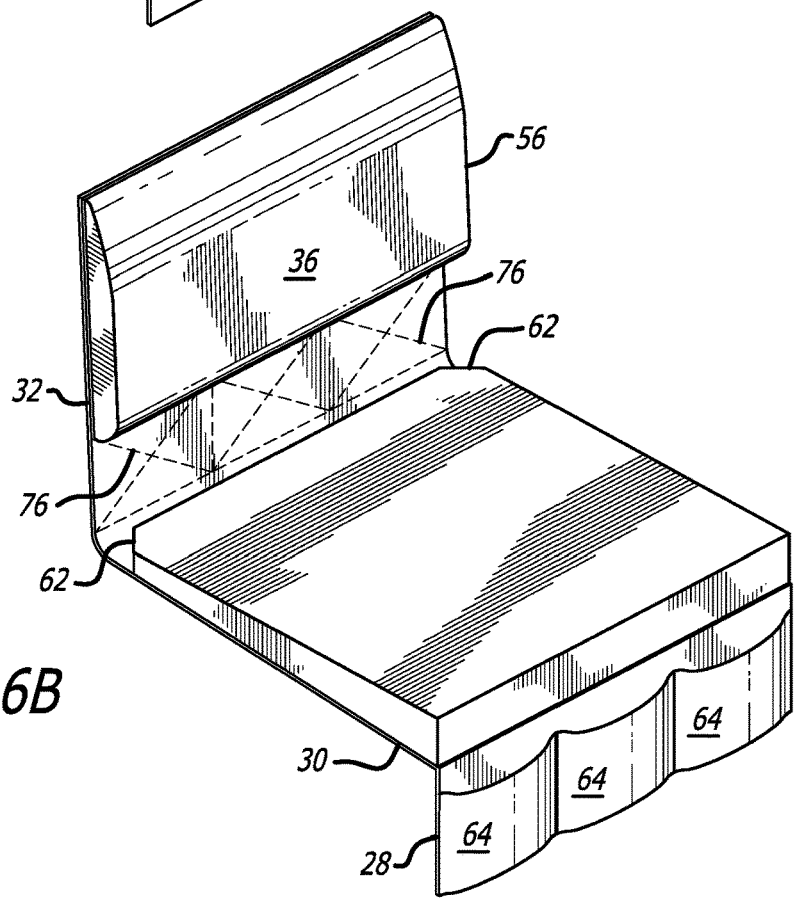
FIG. 6B is a perspective view of yet another seat cushion embodying the invention, with a main cushion having notched corners and a front portion having pockets.
Figure 9:
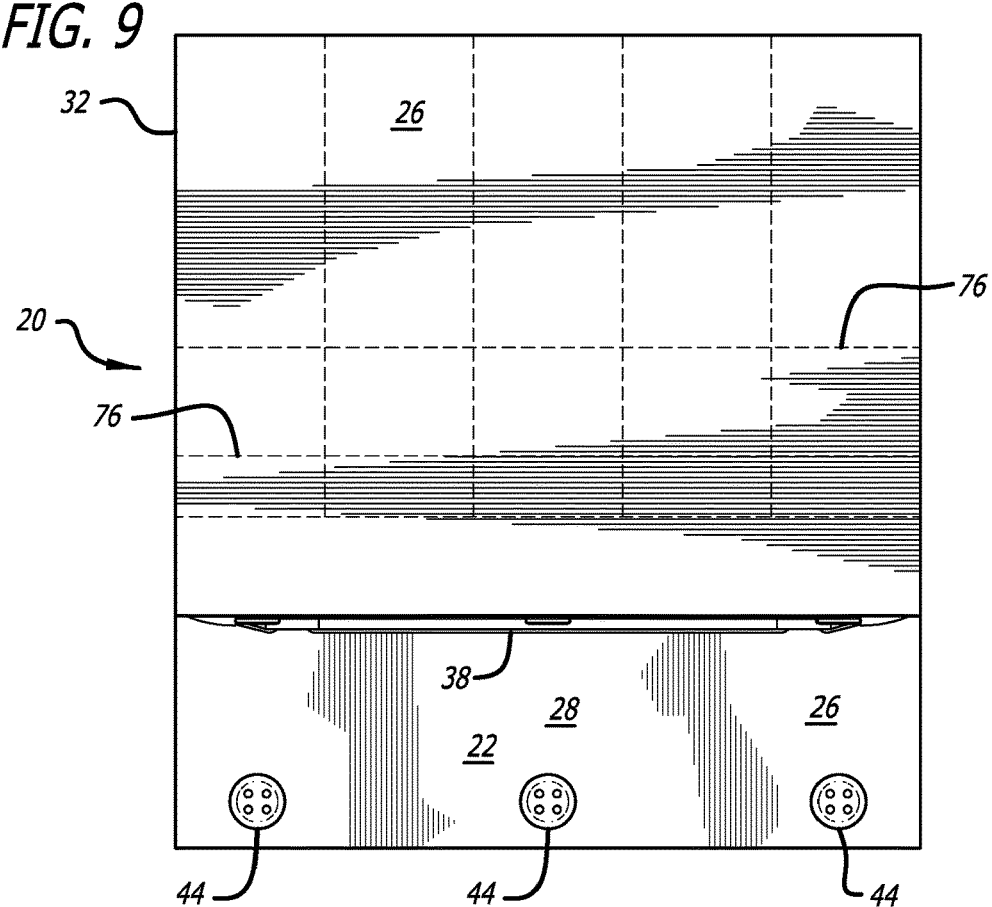
FIG. 9 is a rear view of the seat cushion of FIG. 7.
Figure 15A:
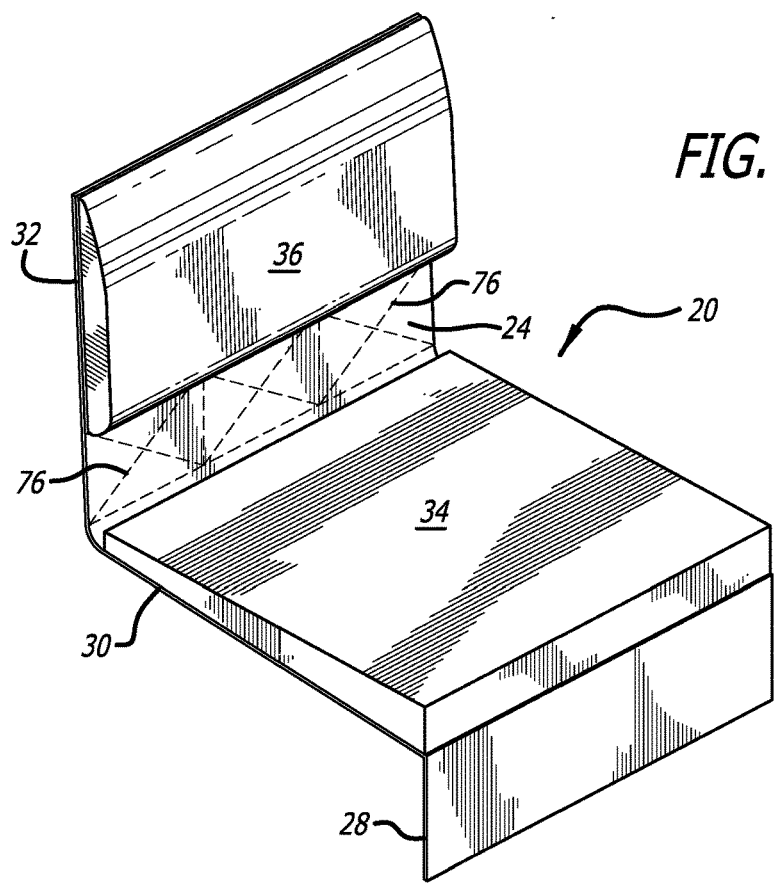
FIG. 15A is a perspective view of an additional seat cushion embodying the invention, with a main cushion having generally square corners.
Figure 15B:
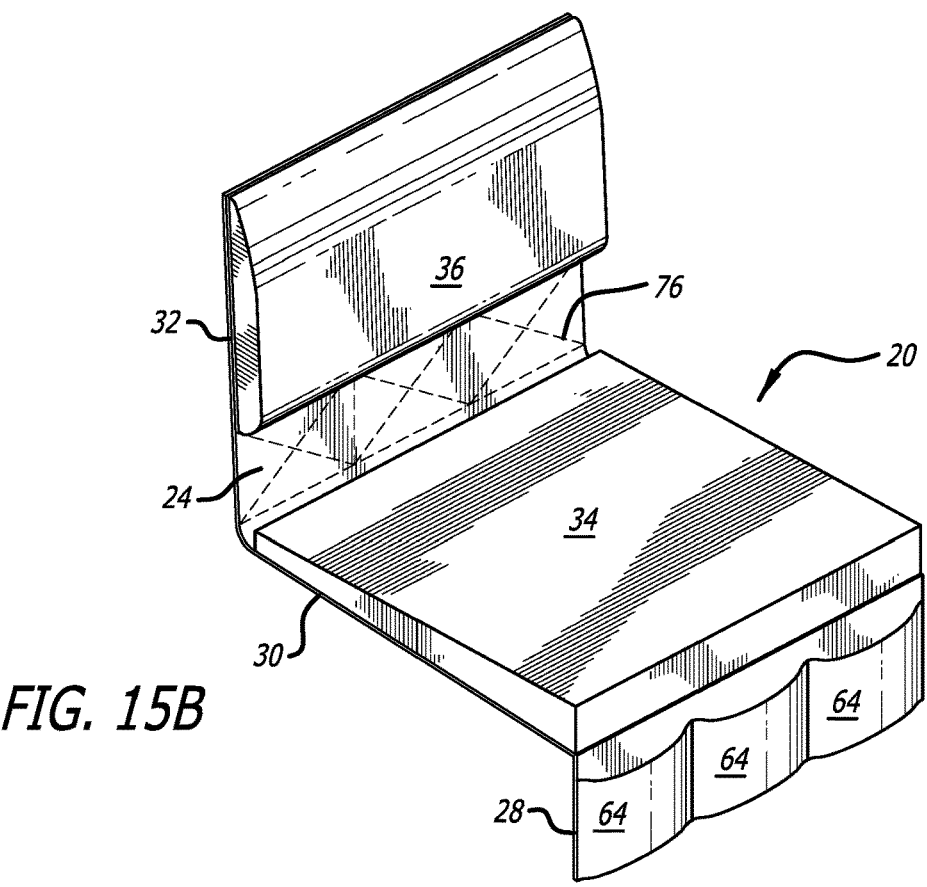
FIG. 15B is a perspective view of a further seat cushion embodying the invention, with a main cushion having generally square corners and a front portion having pockets.
Figure 16:
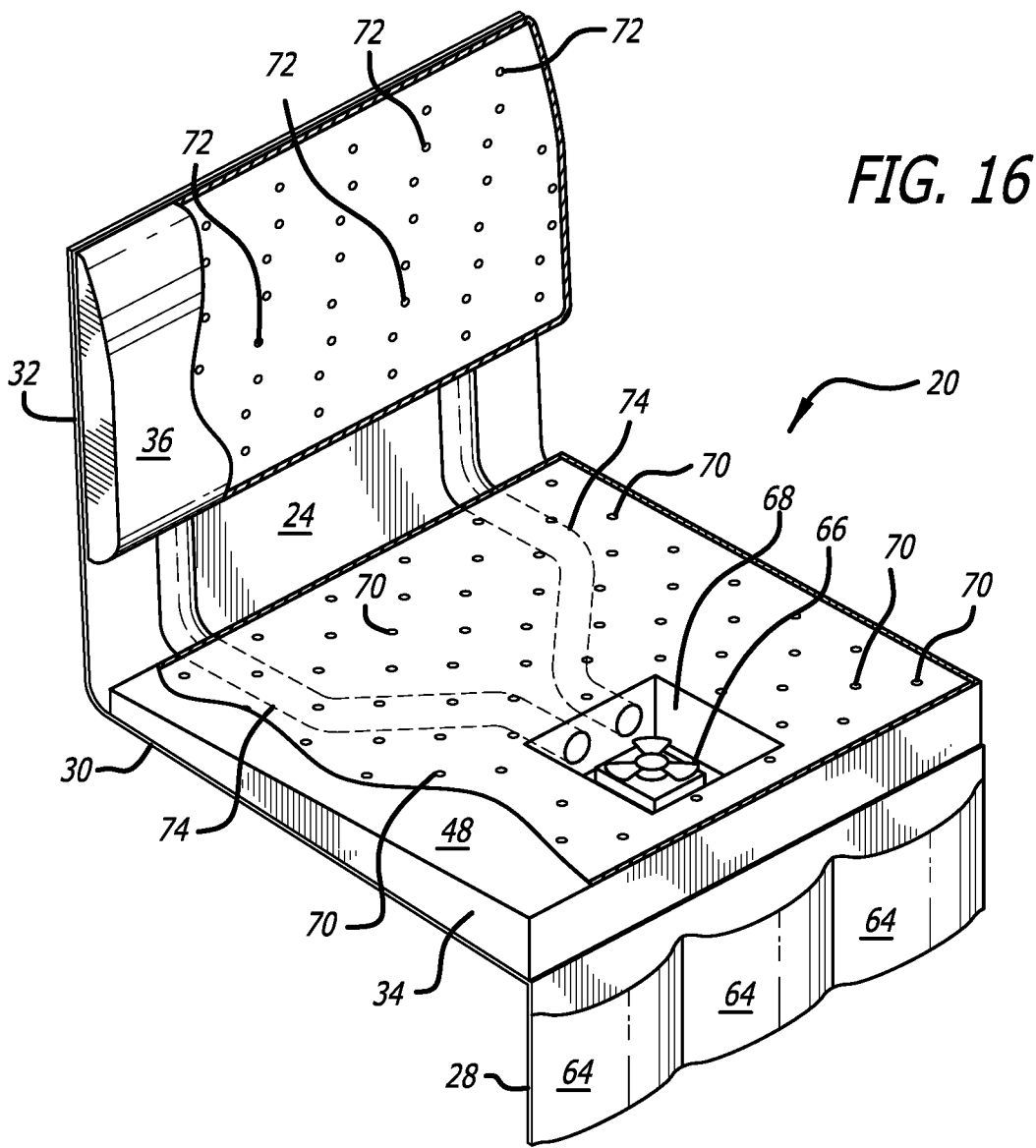
FIG. 16 is a perspective view of yet another seat cushion embodying the invention, where the seat cushion includes a cooling system.

As seen in FIGS. 6B, 15B and 16, in various embodiments of the seat cushion 20, the front portion 28 includes one or more storage pockets 64. The pocket panels 64 may have a variety of dimensions. The pockets 64 are provided for convenient storage of items (e.g., electronic devices, phones, notepads, pens, cups, food, etc.) so the items contained therein are easily accessible to the user when seated. When the seat cushion 20 is in a rolled configuration, the pocket openings face the interior of the rolled up seat cushion 20, which makes the contents of the pockets securely held therein.

As seen in FIG. 16, in an embodiment of the seat cushion 20, the main cushion 34 includes a battery-operated fan 66 providing airflow to surfaces of the main cushion 34. The battery-operated fan 66 is set within an interior compartment 68 formed as a recess within the main cushion 34 located towards a center of the main cushion 34 near the leading edge of the main cushion 34. The fan 66 may be accessed by a user through the opening in the housing 48 of the main cushion 34, allowing batteries (or other alternative power sources) powering the fan 66 to be replaced, or removed for recharging and subsequent replacement. Alternatively, the fan 66 can include a heating element so as to provide heated airflow. In a further embodiment, the main cushion 34 may also include a plurality of perforations 70 located throughout the main cushion 34 and in at least one layer(s) of the main cushion 34. The perforations 70 provide increased airflow. Likewise the back cushion 36 may also include a plurality of perforations 72 located throughout the main cushion 36 and in at least one layer(s) of the back cushion 36. The perforations 70, 72 provide increased airflow through the cushions 34, 36. A number of flexible tubes 74 inserted through passages in the main cushion 34, the base 22, and the back cushion 36 allows air moved by the fan 66 to circulate and provide airflow to surfaces of the cushions 34, 36. The material forming the housings 48, 56 of the main and back cushions 34, 36 may be a gas permeable material.

Figure 17:
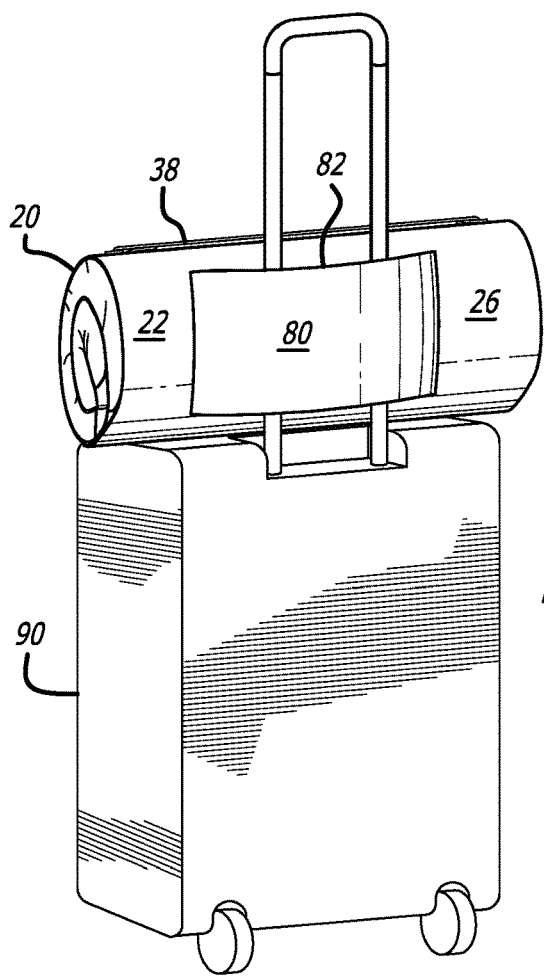
FIG. 17 is a perspective view of a seat cushion embodying the invention, in a rolled configuration, engaging a handle of a piece of luggage, and with the seat cushion resting on top of the luggage for transport.
Figure 18:
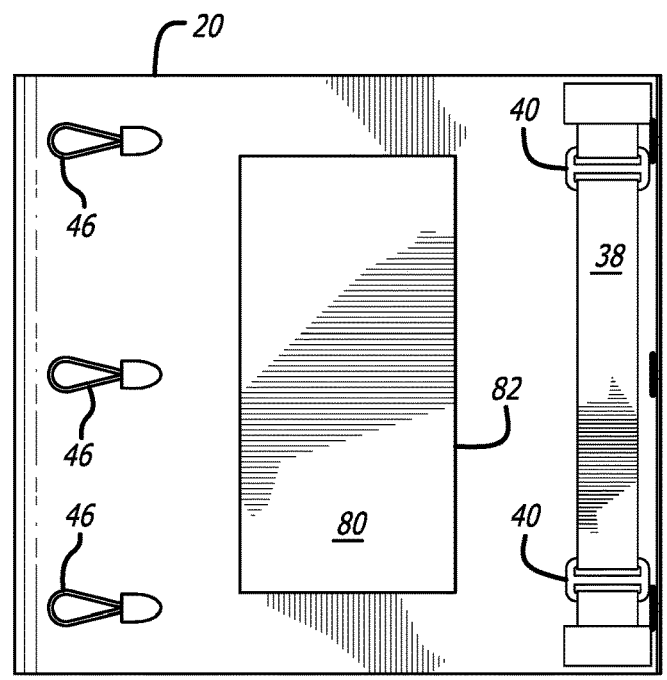
FIG. 18 is a bottom plan view of the seat cushion of FIG. 17 in a deployed configuration.

As seen in FIGS. 17 and 18, to make the seat cushion easier to travel with, a generally rectangular panel 80 could be added to the bottom surface 26 of the base 22, near the strap 38, with an ⅛" opening to allow the seat cushion 20 to slide onto a telescoping handle of a rolling luggage 90. The four-sided panel 80 is connected (e.g., by various methods including, but not limited to stitching, stapling, adhesive, etc.) on two opposite sides to the bottom surface 26, leaving a center portion 82 of the rectangular panel 80 open to allow the extended telescoping luggage handle to slide between the bottom surface 26 of the seat cushion 20 and a surface of the panel 80 facing the bottom surface 26 of the seat cushion 20, between the two sides of the panel 80 not connected to the bottom surface 26.

Figure 2:
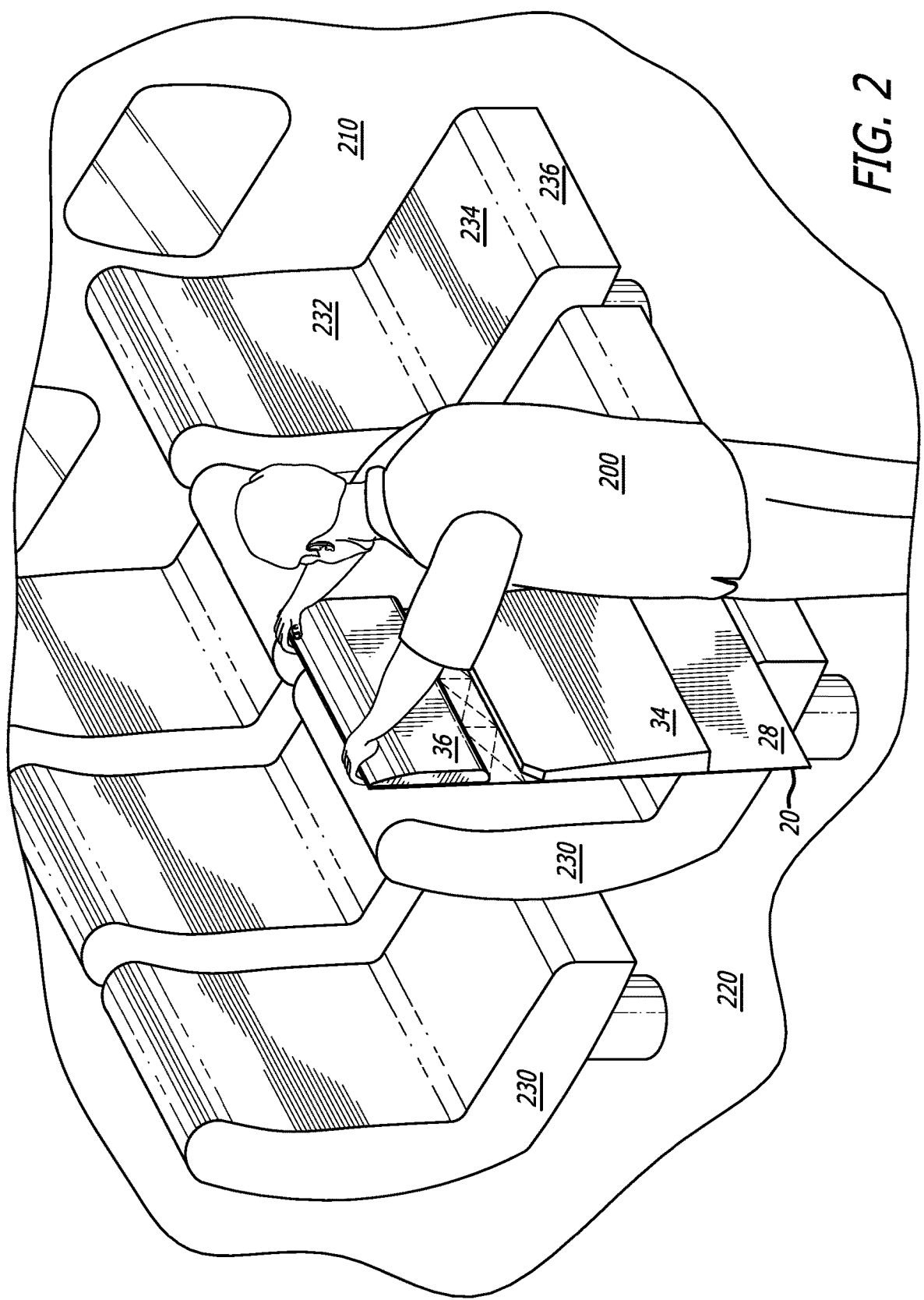
FIG. 2 is another perspective view of the user unrolling the seat cushion of FIG. 1 for placement on a particular seat.
Figure 3:
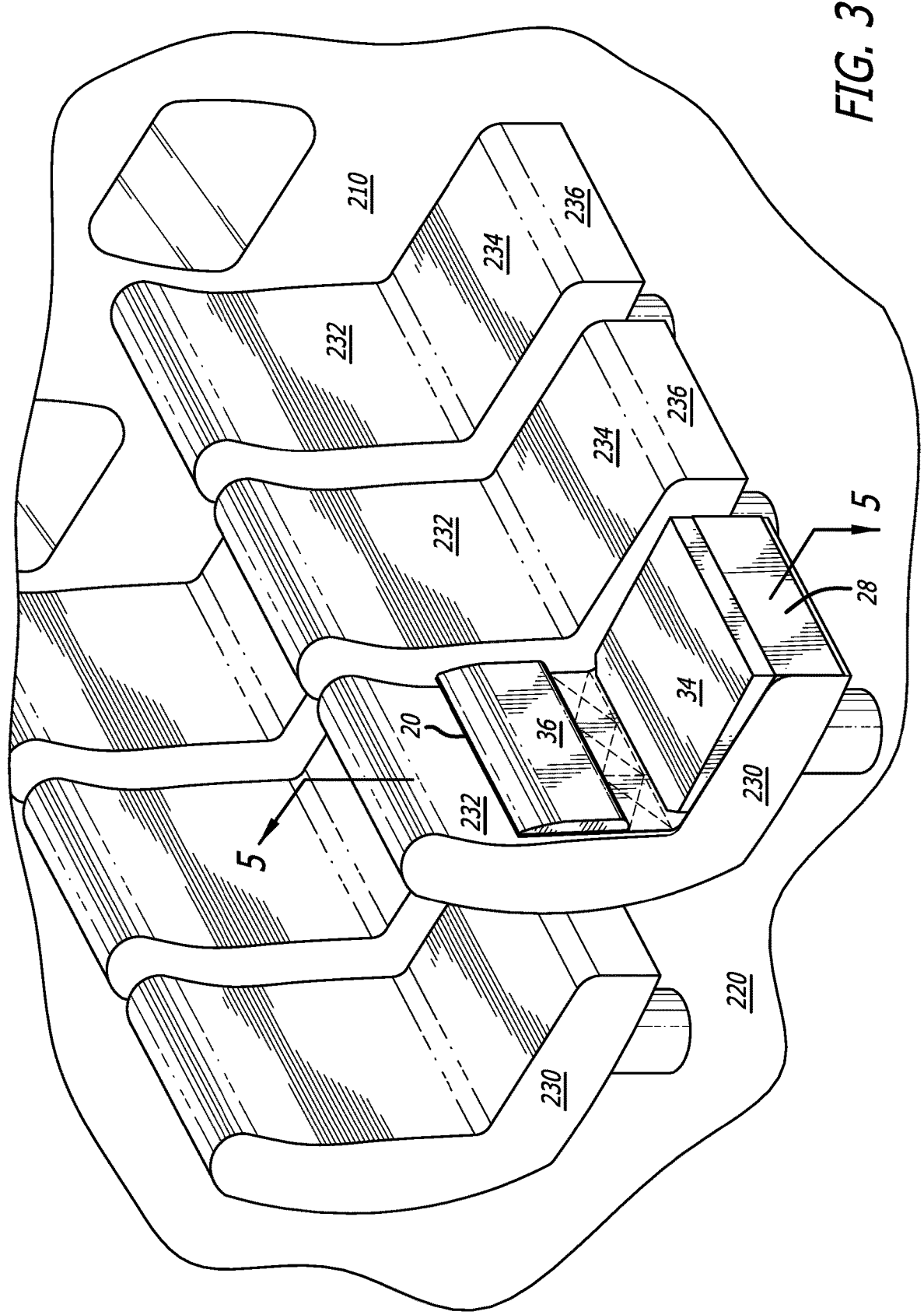
FIG. 3 is yet another perspective view of the seat cushion of FIG. 1 in a deployed configuration on the seat.
Figure 4:
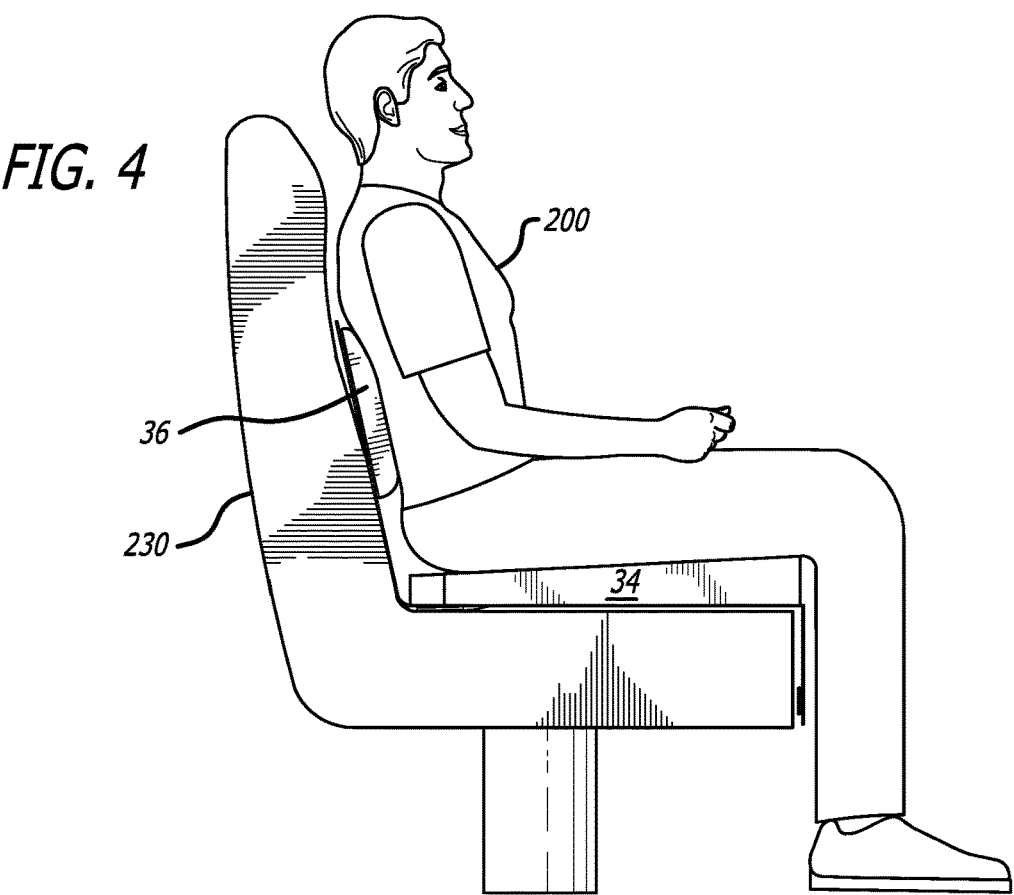
FIG. 4 is a side view of a user sitting on the deployed seat cushion of FIG. 1, with the seat cushion providing lumbar support to the user's back.

In use, as seen in FIG. 1, a user (e.g., a passenger) 200 may board a vehicle (e.g., on a train, bus, aircraft, etc.) 210 and walk down an aisle 220 in the interior of the vehicle 210 to a particular seat 230. A seat cushion 20 in the rolled/fastened configuration is slung over the user's shoulder via the carry strap 38, with the user's arm extending through the opening between the carry strap 38 and the seat cushion 20. As seen in FIG. 2, when standing near or at the seat 230, the user 200 unslings the seat cushion 20, unfastens the fasteners 42 holding the seat cushion 20 in the rolled configuration, and holds the seat cushion 20 in front of them by grasping an end of the back portion 32 of the seat cushion 20. This allows gravity to assist with unrolling the seat cushion 20 so that the seat cushion 20 is in a generally vertical position. As seen in FIG. 3, the user 200 places and positions the seat cushion 20 on the seat 230 with the rear or bottom surface 26 of the base 22 contacting the seat 230. The back portion 32, aided at least in part by the reinforcement stitching 76 to provide upright support for the back portion 32, is placed in a generally vertical position adjacent the generally vertical seat back 232 of the seat 230, with the seat portion 30 resting on the generally horizontal seat top 234, and the front portion 28 hanging in a generally vertical position over a front edge 236 of the seat 230. The material of the surface 26 of the base 22 may provide sufficient friction between the surface 26 of the seat cushion 20 and the surface of the seat 230 engaging the seat cushion 20. As set forth above, the rear or bottom surface 26 of the seat cushion 20 may also include non-slip portions that provide additional frictional resistance to reduce and/or prevent relative movement between the seat cushion 20 and the seat 230. As seen in FIG. 4, the user 200 then sits down on the seat cushion 20. Depending on the size and shape of the particular seat 230, the general position of the seat cushion 20 relative to the seat 230 may be adjusted for the comfort of the user 200 by getting off the seat cushion 20 and adjusting the position of the seat cushion 20 relative to the seat 230. In order to adjust the seat cushion 20 to provide the right spot for lumbar support in connection with this particular seat 230, the user 200 may choose to raise or lower the back cushion 36 relative to the back portion 32. For example, if the back cushion 36 engages the back portion via hook and loop fasteners, the user 200 disengages the back cushion 36 from the back portion 32, adjusts the vertical height of the back cushion 36 relative to the vertically-oriented back portion 32, and re-engages the hook and loop fasteners to hold the back cushion 36 in the new vertical position relative to the back portion 32. The user 200 may do this as many times as necessary in order to achieve lumbar support in a desired position. When the user 200 has reached their destination, the user gets off the seat cushion 20, folds the front portion 28 upward and over so that the front or top surface 24 of the front portion 28 contacts the front or top surface of the seat portion 30. The user then rolls the front and seat portions 28, 30 towards the back portion 32. When the seat cushion 20 has been rolled to the point where the roll contacts the back cushion 36 and/or the back portion 32, the user 200 continues to roll the seat cushion 20. As seen in at least FIGS. 1, 9, and 12-14, when the seat cushion 20 has been rolled to the point where the buttons 44 of the front portion 28 are generally aligned with corresponding loops 46 attached to the seat portion 30, the loops and buttons are matingly engaged by the user, with the fasteners 42 holding the seat cushion 20 in the rolled configuration. The user 200 then picks up the seat cushion 20, extends their arm through the opening between the carry strap 38 and the seat cushion 20, slings the seat cushion 20 over their shoulder, walks down the aisle 220 away from the seat 230, and disembarks from the vehicle 210.

The seat cushion may include various patterns, features, designs, logos, cartoons or the like for ornamental purposes. The seat cushion may be monochromatic, or include various patterns (e.g., multi-color stripes, polka dots or the like) or the like for ornamental purposes.

Although the present invention has been discussed above in connection with seating in public transportation, the present invention may also be used in connection with private transportation (e.g., automobiles, trucks, recreational vehicles, sports utility vehicles, etc.). Furthermore, the present invention is not limited to use with vehicle seating, and may also be used in connection with seating of all kinds (e.g., patio furniture) and/or in all sorts of locations where there is seating including, but not limited to, transportation terminals, sports stadiums, concert arenas, park benches, cafeterias, lecture halls, auditoriums, classrooms, or the like.

In addition, the claimed invention is not limited in size and may be constructed in various sizes in which the same or similar principles of operation as described above would apply. Furthermore, the figures (and various components shown therein) of the specification are not to be construed as drawn to scale.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "front," "rear," "left," "right," "inner," "outer," "beneath", "below", "lower", "above", "upper", "horizontal", "vertical", "lateral", "longitudinal" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A portable seat cushion for placement on a seat for added comfort and support, comprising:
   an elongated rectangular base including a front portion, a seat portion, and a back portion, the base including a top surface and a bottom surface;
   a main cushion couplable to the seat portion; and
   a back cushion couplable to the back portion, the back portion of the base including an outer layer of material and an inner layer of laminated loop fabric to reinforce a lumbar section of the back portion and provide sufficient rigidity to the back portion to be self-supporting and remain generally upright when the back portion is in a generally vertical position and also provide sufficient flexibility to be rolled for transport;

the seat cushion being moveable between a deployed configuration in which the back portion is positioned generally upright and a rolled configuration for transport.

2. The seat cushion of claim 1, wherein the back cushion is adjustable in position along the back portion.

3. The seat cushion of claim 1, wherein the back cushion includes fasteners matingly engagable to fasteners on the back portion.

4. The seat cushion of claim 1, wherein the main cushion includes a wedge-shaped layer of memory foam.

5. The seat cushion of claim 1, wherein the main cushion includes a first layer, and a second layer stacked on top of the first layer, wherein the first layer includes a wedge-shaped material having a density different than a density of the second layer.

6. The seat cushion of claim 5, wherein the main cushion further includes a third layer having a density different than at least one of the densities of the first and second layers.

7. The seat cushion of claim 6, wherein a bottom two of the first, second, and third layers include slits configured to facilitate movement of the seat cushion between the deployed and rolled configurations.

8. The seat cushion of claim 1, wherein the back cushion includes a first layer, and a second layer adjacent the first layer of the back cushion, wherein the first layer of the back cushion includes a material having a density different than a density of the second layer of the back cushion.

9. The seat cushion of claim 1, wherein the front portion includes fasteners matingly engagable to fasteners on the seat portion to hold the seat cushion in the rolled configuration.

10. The seat cushion of claim 1, wherein the front portion includes at least one pocket.

11. The seat cushion of claim 1, wherein the back portion includes reinforcement stitching disposed in a vertical direction to provide stiffening of the back portion and vertical support to keep the back portion generally upright when the back portion is in a generally vertical position.

12. The seat cushion of claim 1, wherein the bottom surface of the base includes at least one non-slip friction pad to increase friction between the seat cushion and a surface upon which the seat cushion rests.

13. The seat cushion of claim 1, further comprising a carry strap secured on both ends to the bottom surface of the base.

14. The seat cushion of claim 1, further including a battery-operated fan disposed within a recess of the main cushion, the fan configured to provide airflow to surfaces of the seat cushion.

15. The seat cushion of claim 1, further comprising a generally rectangular panel connected on opposite sides to the bottom surface of the seat cushion such that an opening is defined between the rectangular panel and the bottom surface of the seat cushion to allow a luggage handle to slide within the opening between the bottom surface of the seat cushion and a surface of the panel facing the bottom surface of the seat cushion.

16. A portable seat cushion for placement on a seat for added comfort and support, comprising:

a base including a seat portion and a back portion, a main cushion couplable to the seat portion; and a back cushion couplable to the back portion such that the back cushion provides lumbar support to a user when the seat cushion is disposed on a seat and the back portion is in a generally vertical position;

the seat cushion being moveable between a deployed configuration in which the back portion is positioned generally upright and disposed on a seat and a rolled configuration for transport, the back portion including reinforcement stitching that is disposed in a vertical direction and that is configured to stiffen the back portion to maintain the back portion positioned generally upright when the seat cushion is in the deployed configuration, the base being flexible such that the seat cushion can be moved to the rolled configuration.

17. The seat cushion of claim 16, wherein the back portion of the base includes an outer layer of material and an inner layer of laminated loop fabric configured to reinforce a lumbar section of the back portion maintain the back portion in the deployed configuration and also provide sufficient flexibility such that the seat cushion can be moved to the rolled configuration.

18. The seat cushion of claim 16, wherein the main cushion is formed with at least one foam material and is removably disposable within an outer housing, the outer housing coupled to the base.

19. The seat cushion of claim 16, wherein the back cushion is formed with at least one foam material and is removably disposable within an outer housing, the outer housing coupled to the base.

20. A portable seat cushion for placement on a seat for added comfort and support, comprising:

a base including a seat portion and a back portion, a main cushion couplable to the seat portion and formed with at least one foam material and removably disposable within an outer housing; and a back cushion couplable to the back portion and formed with at least one foam material and removably disposable within an outer housing in a location such that the back cushion provides lumbar support to a user when the seat cushion is disposed on a seat and the back portion is in a generally vertical position, the back portion of the base including an outer covering and an inner layer of laminated loop fabric to reinforce a lumbar section of the back portion and provide sufficient rigidity to the back portion to be self-supporting and remain generally upright when the back portion is in a generally vertical position and also provide sufficient flexibility to be rolled for transport, the seat cushion being moveable between a deployed configuration in which the back portion is positioned generally upright and disposed on a seat and a rolled configuration for transport, the base being flexible such that the seat cushion can be moved to the rolled configuration.

* * * * *